Nov. 26, 1968  F. MAYER  3,413,542
DEVICE FOR PROVIDING AN INDICATION OF THE ORIENTATION OR
CONFIGURATION OF A SURFACE BY CORRELATING THE OUTPUT
OF A DISTANCE PROBE ROTATING RELATIVE TO THE SURFACE
Filed Jan. 21, 1965  3 Sheets-Sheet 1

INVENTOR
FERDY MAYER
By Irwin S. Thompson
ATTY.

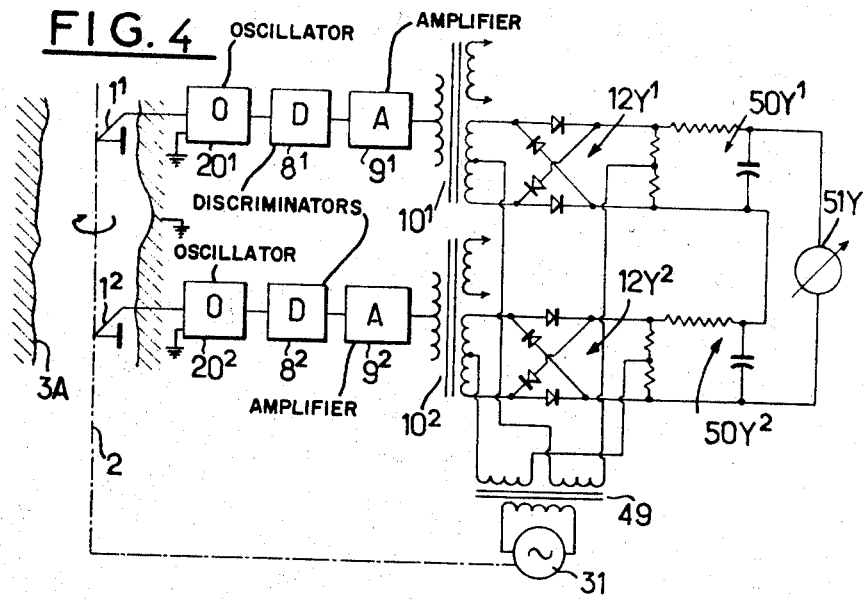
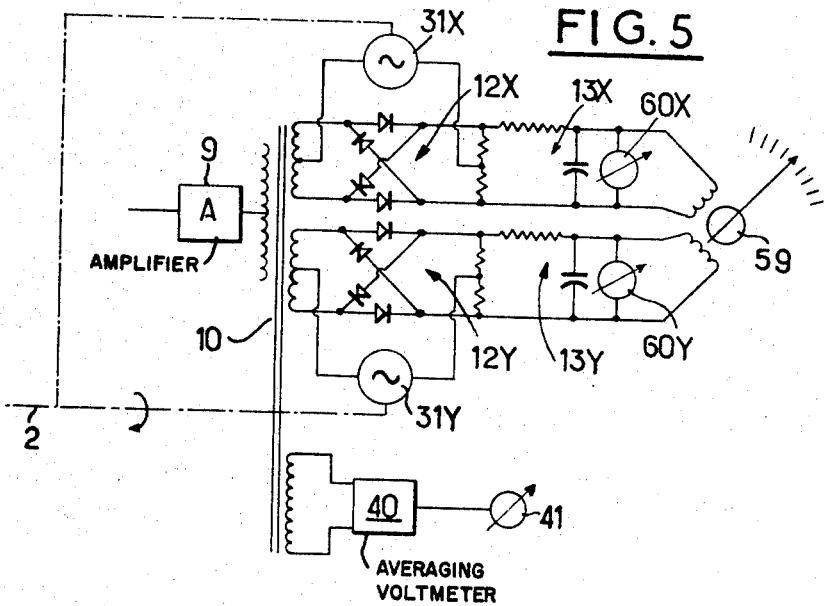

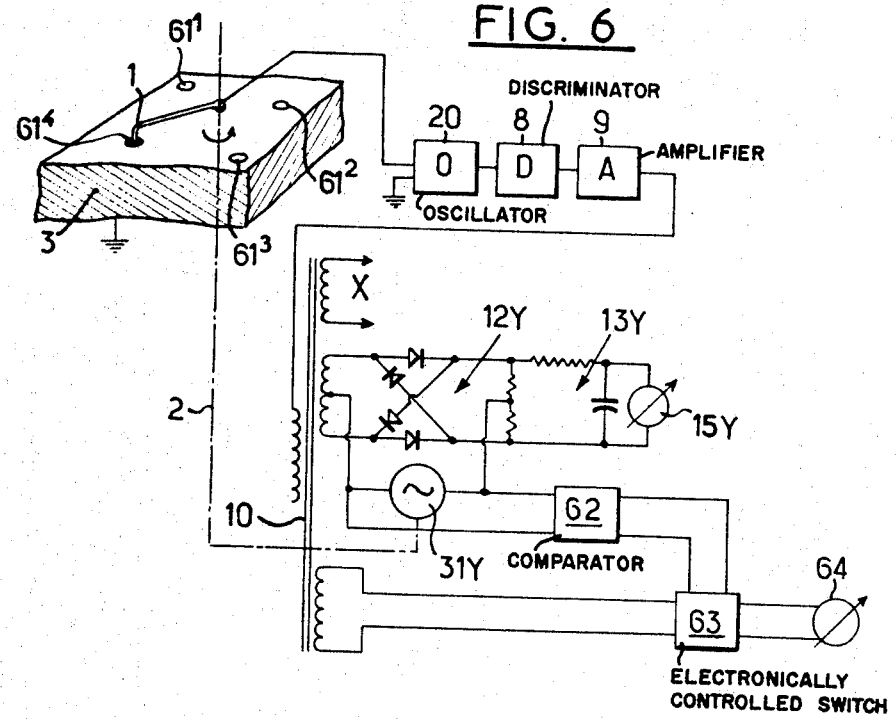
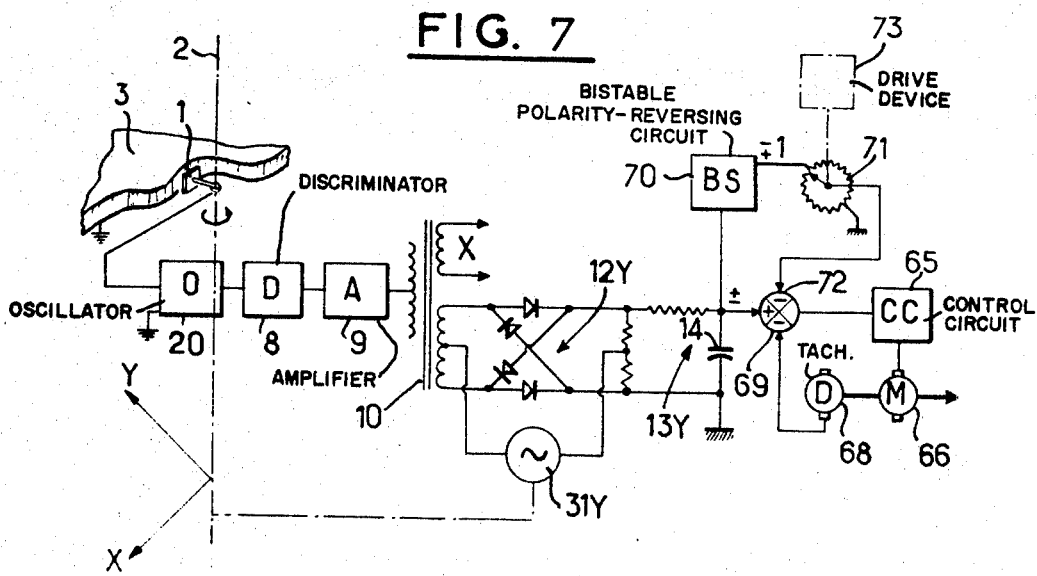

United States Patent Office 3,413,542
Patented Nov. 26, 1968

3,413,542
DEVICE FOR PROVIDING AN INDICATION OF THE ORIENTATION OR CONFIGURATION OF A SURFACE BY CORRELATING THE OUTPUT OF A DISTANCE PROBE ROTATING RELATIVE TO THE SURFACE
Ferdy Mayer, 22 Rue Ampere, Grenoble, Isere, France
Continuation-in-part of application Ser. No. 681,033, Nov. 6, 1967. This application Jan. 21, 1965, Ser. No. 426,983
Claims priority, application France, Jan. 22, 1964, 961,146
15 Claims. (Cl. 324—61)

ABSTRACT OF THE DISCLOSURE

A device for producing an indication of the orientation or configuration of a surface by means of a distance indicating probe rotating relative to the surface, a correlator device connected to receive the output of the probe and reference signals synchronized with the frequency of such relative rotation, and means for generating a further signal determined at least in part by such relative rotation and combining the further signal with the output of the probe for producing an indication of a characteristic of the surface with respect to the axis of probe rotation.

---

This application is a continuation-in-part of my application U.S. Ser. No. 290,744 filed on June 26, 1963, and now abandoned in favor of application Ser. No. 681,033, filed on Nov. 6, 1967.

This invention relates to means for monitoring the orientation and condition of a surface by means of a probe rotating relatively thereto, and more particularly to improved means for utilizing the information thus obtained.

In the above-named parent application, there was described a procedure for monitoring the relative position of an object with respect to a member rotating relatively thereto. According to this procedure, there is produced a periodic measuring signal determined by the variations of the distance between the object and a probe placed on the member. At least one periodic reference signal is produced in synchronism with one selected reference angular position of the member and the measuring signal is divided into compartments each of which is in synchronism with a respective one of said reference signals.

This procedure was characterized by a shaping of the wave form of the reference signal or signals according to a weighting function selected so as to produce the result desired for any particular application.

As was described in the earlier specification this procedure may be put into operation with the aid of correlators of the synchronous detector type, one input of each correlator receiving one of the components of the measuring signal and the other input thereof receiving one of said reference signals.

It is a principal object of this invention to provide various arrangements for utilizing the information obtained according to the above-noted procedure.

It is more particularly an object of the present invention to provide various means for presenting the information thus obtained, such means including, for example: oscilloscope displays; indications of the amplitudes of surface defects (with respect to a reference plane or circle); and indications of periodic variations from a reference curve.

In accordance with one specific embodiment of this invention, display means are provided for permitting the alignment of the axis of rotation of the probe so as to make it perpendicular to or coaxial with the surface probed.

These and other characteristics, features and advantages of the present invention will become better understood from the following detailed description when taken together with the attached drawings, in which:

FIG. 4 is a partially pictorial circuit diagram of an axis centering arrangement utilizing two rotary probes;

FIG. 5 is a circuit diagram of a dynamic centering apparatus according to the present invention;

FIG. 6 is a partially pictorial circuit diagram of an embodiment of the present invention for aligning a piece with respect to a three-dimensional refrence system; and FIG. 7 is a partially pictorial circuit diagram of a curve follower device according to the present invention.

FIG. 1 shows a device according to the present invention for displaying the variations in distance between a probe 1 and an object 3 on the screen of an oscilloscope.

Figure 1:
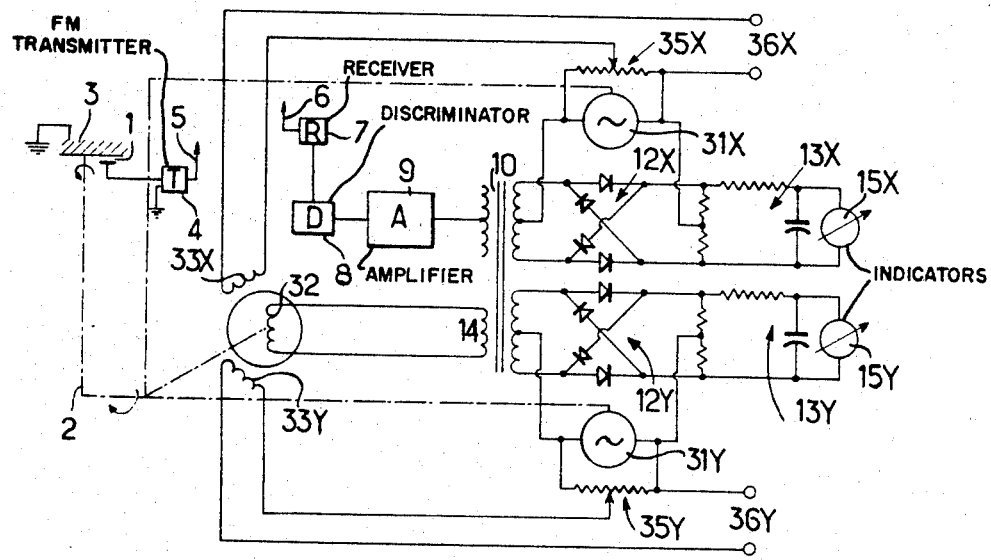
FIG. 1 shows a circuit diagram of an embodiment of the present invention for providing a visual representation of the surface probed.

In this device, the variation in capacity (caused by variations in distance) between probe 1 and piece 3 provokes proportional variations in the frequency of the signal produced by a miniature transmitter 4, which frequency modulated signal is radiated by an antenna 5. The radiated signal is picked up by a receiving antenna 6 feeding a receiver 7 which amplifies the signal and conducts it to a suitable frequency discriminator 8. The output from discriminator 8, which is a voltage whose amplitude varies in proportion to the frequency variation of the transmitter output signal, is fed to the input of a low frequency-band amplifier 9 the lower end of whose amplifying band is of the order of the frequency of rotation of probe 1.

The output from amplifier 9 is delivered to the primary winding of a transformer 10 having two secondary windings each of which provides one input for a respective one of the synchronous demodulators 12X and 12Y. The second input to each demodulator is in the form of a reference signal weighting function provided by sine wave sources 31X and 31Y, respectively. These sources may take the form of the respective two-phase stator windings of a rotating sine wave generator whose rotor is in the form of a permanent magnet or D.C. energized electromagnet mounted for rotation with probe driving shaft 2. Therefore, the frequency of the outputs from these sources will always equal the frequency of rotation of probe 1 and the phases of these outputs, which will always be 90° apart from one another, will be synchronized with a predetermined angular position of probe 1.

The mode of operation of synchronous demodulators is well-known per se and has been fully described in the above-mentioned parent application. Therefore these circuits will not be described in detail here. Suffice it to say that these units function in such a way that the amplitude of their output waveform is proportional to the product of the amplitudes of their two input waveforms.

The outputs from demodulators 12X and 12Y are fed to respective averaging filter circuits 13X and 13Y whose outputs are proportional to the average deviation of the capacity between elements 1 and 3 with respect to two orthogonal axes parallel to the plane of rotation of probe 1, each of said axes corresponding to the angular positions of probe 1 for which the output from one of said sources is zero, as is fully explained in said parent application.

The outputs of filtering circuits 13X and 13Y are fed to respective indicators 15X and 15Y of which indicates the magnitude of a respective one of said average deviations.

Transformer 10 is also provided with a third secondary winding 14 feeding the rotor 32 of a two phase rotary transformer rotatively coupled to shaft 2. The secondary stator windings 33X and 33Y of this transformer are excited by the signal appearing on rotor winding 32, and by the rotation thereof, in such a way as to produce a pair of voltages representing orthogonal components of the instantaneous variations in distance between probe 1 and piece 3.

In order to provide a polar oscilloscope display of these variations, each of these components is added to a variable fraction of the output of a respective one of the sources 31X and 31Y, these fractions being obtained at the movable taps of respective potentiometers 35X and 35Y, each of which has its end terminals connected across a respective one of said sources. Each of the two composite signals is fed to a respective pair of terminals 36X and 36Y serving as the input terminals for the X and Y deflection plates, respectively of an oscilloscope (not shown). The movable taps of potentiometers 35X and 35Y may be adjusted at will in order to give the oscilloscope trace the size desired and in order to give this trace a roughly circular path. The display will then have a form similar to the curve 39 of FIG. 3.

Figure 2:
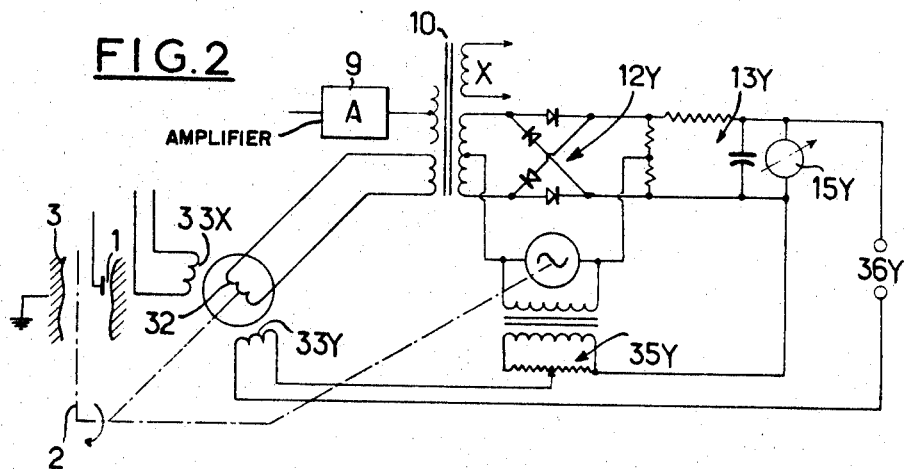
FIG. 2 shows a variation of the device of FIG. 1.

Although the resulting display will indicate the imperfections in the probed surface of piece 3, it can not produce an accurate indication of the deviation of the probe rotation axis from a position perpendicular to the surface, in the case of the exploration of the flat piece of FIG. 1, or from a position coaxial with the surface, in the case of the exploration of a bore or hole such as the one indicated in FIG. 2. For this reason, the indicators 15X and 15Y are provided to indicate the deviation of axis 2 from the desired alignment or position. When the readings of both indicators are zero, the axis is properly aligned or positioned and the oscilloscope trace provides an accurate indication of the locations and magnitudes of the imperfections in the explored surface. A knowledge of the total amplification factor existing between the initial capacity variation and the oscilloscope voltage sensitivity will then permit an accurate determination of the magnitudes of these imperfections.

FIG. 2 shows a modification of the arrangement of FIG. 1 wherein the probe 1 is used to explore the contour of a bore or hole 3 and where it is desired to center axis 2 on the longitudinal axis of the bore. The circuit shown differs from that of FIG. 1 only in that, for each oscilloscope deflection signal, the voltage across a respective one of the average value indicators 15X and 15Y (the latter being shown in the figure) is added to the voltages applied in the arrangement of FIG. 1. Thus, for example, rotary transformer secondary 33Y, a portion of potentiometer 35Y, and the input terminals of 15Y are all placed in series across the oscilloscope deflection terminals 36Y. A similar arrangement is provided for the corresponding elements of the X circuit path. It thus results that the oscilloscope trace generated indicates not only the imperfections in the explored surface, but also, by the displacement of the average path of curve 39 of FIG. 3 from a position concentric with a reference axis point on the oscilloscope screen, the deviation of axis 2 from its desired position.

Figure 3:
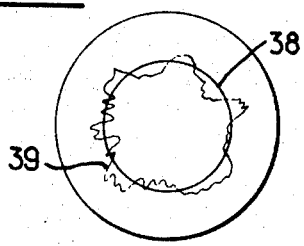
FIG. 3 is a pictorial view of the presentation of the outputs from the device of FIG. 2 on an oscilloscope screen.

The device of FIG. 2 may be used with an oscilloscope capable of producing two curves, the inputs for the second curve-producing beam being provided by a source of a pair of equal amplitude orthogonal sine waves which produce the reference trace 38 of FIG. 3. The average deviation of curve 39 from a concentric position with respect to curve 38, whose position is unvariable, then directly indicates the magnitude and direction of the deviation of axis 2 from the axis of bore 3.

FIG. 4 shows a variation of the basic invention wherein a pair of probes $1^1$ and $1^2$ are mounted for rotation about the same axis 2 for permitting the accurate alignment of this axis with the longitudinal axis of bore 3A. Each probe is associated with a signal processing circuit comprising an oscillator $20^1$ or $20^2$, a discriminator $8^1$ or $8^2$, and an amplifier $9^1$ or $9^2$. The output of each amplifier feeds the primary winding of a respective one of the transformers $10^1$ and $10^2$. Each transformer comprises two secondary windings, each of which feeds a respective circuit for obtaining a respective weighted signal corresponding to one of the orthogonal reference axes of its associated probe. In the figure, only the Y-axis circuitry for each probe is shown, it being understood that in reality indentical X-axis circuitry is also provided and is connected to the other secondaries of the transformers $10^1$ and $10^2$. The Y-axis circuitry associated with each probe comprises a synchronous demodulator $12Y^1$ or $12Y^2$ receiving one input from its respective transformer secondary and feeding a respective averaging filter circuit $50Y^1$ or $50Y^2$. The other input to each demodulator is in the form of a reference weighting signal derived from a respective secondary of a transformer 49 whose primary winding is fed by a Y-axis reference signal generator 31 whose exciting winding is mounted for rotation with probe axis 2. The circuits described above function in the same way as the comparable circuits of FIG. 1 of said parent application and FIG. 1 of the present specification.

The outputs form circuits $50Y^1$ and $50Y^2$ are fed in series opposition to an indicating instrument 51Y. This series opposition relation may be realized by winding the secondaries of transformer $10^1$ in the opposite sense from the corresponding secondaries of transformer $10^2$.

With this arrangement, the reading of indicator 51Y will be zero only when the axis 2 is parallel to the mean longitudinal axis of bore 3A, i.e. when the average of the output from circuit $12Y^1$ equals that from circuit $12Y^2$.

It should be noted, however that indicator 51Y will not indicate whether axis 2 is centered in the bore because this indicator will read zero for every case where both probes are displaced by the same distance, and in the same radial direction, from the bore axis. In order to determine whether axis 2 is so centered it is only necessary to place a second indicator, similar to one of the indicators 15 of FIG. 1 for example, across the output of either filter circuit 15Y. Both the alignment and the centering of axis 2 will then be indicated by the zero reading of both indicators. Alternatively, the centering indication may be obtained by temporarily suppressing the signal originating from one of the probes.

The same operation could be achieved with the aid of a single signal processing circuit and a single indicator either by taking a succession of readings each corresponding to a different longitudinal position of the probe or by taking an average reading derived from a plurality of probes connected in common and displaced at intervals along the axis 2.

Finally, such an arrangement can be used to determine the profile of the bore by advancing the probe along axis 2 and recording the resulting signal.

Turning now to FIG. 5 there is shown an arrangement for permitting a rapid dynamic balancing of a rotating object. In this embodiment the probe and the object have the relation shown in FIG. 5 of the above-mentioned parent application, with the probe being stationary and the object rotating in "vibrating" bearings and being mounted for rotation with axis 2.

Transformer 10 comprises an auxiliary secondary winding which feeds an averaging voltmeter 40 whose indicator 41 thus indicates the amplitude of any existing dynamic unbalance.

The outputs of demodulators 12X and 12Y are fed to respective averaging filters 13X and 13Y, all of these circuits being identical in structure and function to the similarly identified circuits of FIG. 1. The outputs from circuits 13X and 13Y are each fed to a respective one of the two-phase input windings of a ratio indicator 59.

Thus the deflection of the needle of this indicator reveals the acute angle formed between the radial line passing through the center of gravity of the piece (the center of gravity being displaced from the center of rotation if the piece is not balanced) and one reference axis. The polarities of the indications of instruments 60X and 60Y indicates the quadrant in which this unbalance lies. Thus the readings of these instruments together with that of indicator 41 reveal the exact weight which must be added, and the point at which it must be added to dynamically balance the piece.

Turning now to FIG. 6, there is shown a system for effectuating the complete orientation of a piece with respect to three mutually perpendicular reference axes: the axis of rotation 2 and two orthogonal axes perpendicular thereto.

The arrangement comprises a probe 1 rotating about axis 2 and feeding an oscillator 20 in such a way that the oscillator output frequency varies in proportion to the distance separating probe 1 from the upper surface of piece 3. The output from oscillator 20 is fed to a discriminator 8 and the amplitude modulated signal therefrom is supplied to the primary winding of a transformer 10 through the intermediately of a suitable amplifier 9. Transformer 10 has two secondaries feeding respective signal processing circuits corresponding to respective ones of the pair of reference axes perpendicular to axis 2 (these axes being designated by X and Y). Only, the Y-axis circuit is here shown in detail, it being understood that an identical arrangement is provided for the X-axis.

The output from amplifier 9 is combined with a reference weighting signal produced by generator 31Y, which is driven in synchronism with probe 1, in a synchronous demodulator 12Y. The resulting product signal is fed to an averaging filter 13Y and thence to voltage-responsive indicator 15Y. In a manner similar to that described in connection with the circuits previously discussed herein, the readings provided by instrument 15Y and by a similar instrument in the X-axis circuit define the orientation of the explored surface with respect to a plane perpendicular of axis 2.

The probe 1 has a fine tip which traverses a circular path passing over four accurately positioned holes 61 serving as reference points in the plane of the explored surface of piece 3. Each alternate pair of holes (61$^1$ and 61$^3$ for example) lies on a line which is to be aligned with a respective one of the reference axes X and Y.

The passage of the probe over each of these holes provokes a voltage pulse on the output of amplifier 9. Since these pulses are symmetrically distributed over the period of rotation of probe 1, they will be balanced out in the averaging filters 12 and hence will not adversely affect the accuracy of the indications provided by instruments 15.

The transformer 10 is provided with a third secondary winding which serves to couple the output from amplifier 9 to the information input of an electronically controlled switch 63, which may be a correlator for example. The control input to unit 63 is furnished by a voltage comparator 62 (of the multiar type for example) which is connected to generator 31Y so as to produce an output pulse each time the generator signal passes through zero.

Unit 63 thus receives, as one input, the pulses produced by the passage of probe 1 over holes 61, which pulses are thus dependent on the orientation of piece 3 in the plane of the X and Y axes, and, as the other input, the pulses generated by comparator 62, which pulses are perfectly synchronised with the passage of probe 1 across one of the reference axes X or Y. Thus, when the pulses from comparator 62 occur at the same moment as pulses from amplifier 9, the angular position of piece 3 will be perfectly adjusted with diagonally opposed pairs of holes lying on the X and Y axes, respectively.

Assuming first that piece 3 is slightly rotated about axis 2 away from its desired position, the operation of this device is such that the average value of the product output from correlator 63, which is indicated by indicator 64, will be less than maximum. It is then only necessary to rotate piece 3 about axis 2 until instrument 64 peaks in order to properly position the piece. The alignment of the explored surface of piece 3 in a plane perpendicular to axis 2, which alignment is achieved by pivoting the piece about the X and Y axes until both instruments 15 read zero, may be effected either before or after the above-described positioning operation.

In all of the above described embodiments, the information signals have been used only to provide indications of the position of the piece, either by means of an indicating instrument or an oscilloscope: these signals may also be used for automatic positioning systems in which they serve as error signals for controlling the movement of a machine work table, for example.

Turning now to FIG. 7, there is shown an extremely useful and flexible application of the present invention to a curve following device. This device may be used, for example, to control the movement of a machine tool so as to cause it to follow the outline of a complex master curve formed, for example, by the edge of a piece 3.

The device is characterized by the fact that the function of a feeler is performed by rotary probe 1, which does not contact the master curve. As a result, this curve may be made of a relatively flexible material, a thin metal strip supported at several points for example, and is thus relatively easy to shape.

The apparatus shown comprises a rotating probe 1 rotating at a constant velocity about an axis 2. The shaft (not shown) forming axis 2 may be mounted on a movable carriage which can be driven along axes X and Y of a coordinate system by respective motors which will be described below. This carriage may also carry a cutting tool for reproducing the master curve. Alternatively, axis 2 and the cutting tool may be fixed and piece 3 may be rigidly joined to the work piece and mounted on the movable carriage. In either case, the rate of rotation of probe 1 will be relatively high with respect to the rate of movement of the carriage so that, for a single cycle of rotation of the probe, piece 3 is substantially stationary with respect to axis 2.

The capacity variations between probe 1 and piece 3 are sensed by an oscillator 20 which feeds of units 8, 9, 10, 12, 13 and 31. Both oscillator 20 and all of the above-enumerated units are identical with the like-numbered units of FIG. 6. In FIG. 7 only the weighting circuit for indicating capacity variations along the Y axis are shown, the identical X-axis untis, 12X, 13X and 31X, having been ignored for the sake of clarity.

The output of filter circuit 13Y appears across capacitor 14 and is connected ot a positive input of differential circuit and the input terminal of a bistable, polarity-reversing circuit 70. Circuit 70 may consist of a Schmidt trigger whose output has a constant amplitude and a polarity which is the inverse of the polarity of the voltage across capacitor 14.

The output from circuit 70 may be fed directly to a negative input terminal 72 of the differential circuit or, if it is desired that axis 2 follow the master curve more closely, the output from 70 may be fed to a potentiometer 71 whose movable tap is driven by a device 73, which will be described in detail below. Potentiometer 71 is formed, and its movable tap is driven, so that its output is proportional to the sine of the angle formed between the Y coordinate axis and a line tangent to the portion of the master curve opposite which probe 1 passes during each rotation.

The output from differential circuit 72 is fed to a control circuit 65, which may amplify this output if necessary, and the output from circuit 65 feeds a driving motor 66 which drives the movable carriage along the Y axis.

The output of motor 66 also drives a tachometric device 68 whose output is fed to a second negative input 69 of the differential circuit.

Element 68 thus forms a feedback loop which serves to stabilize the response of motor 66 to the differential circuit output.

It should be appreciated that in practice the complete apparatus contains a second set of units identical with the units 66, 68–73 connected in the same way to the output of filter circuit 12X (not shown), the only difference between these units and those shown being that the potentiometer corresponding to potentiometer 71 is arranged to provide a signal proportional to the cosine of the angle defined above.

In operation, the probe 1 is set in rotation and the capacity variations resulting therefrom are acted on by the various circuits 20, 8, 9, 10, 12Y and 13Y in exactly the same manner as that described in connection with FIGS. 1 and 6 above. The polarity of the output appearing across capacitor 14 will depend on the side of the X-axis to which the master curve lies, i.e., if the curve lies to the side of the X axis as shown, the output from amplifier 8 will always be greater during the positive half-cycle of the weighting signal from oscillator 31Y than during the negative half-cycle thereof, while if the curve portion opposite which probe 1 rotates lies to the other side of the X axis, the inverse will be true. A similar condition of course exists for the relation between the Y-axis and the output of filter circuit 12 X (not shown). The amplitude of the output across capacitor 14 is proportional to the distance, along the Y axis, separating axis 2 from piece 3 multiplied by the sine of the angle defined above.

The output from circuit 70, whose polarity is always the inverse of the polarity of the signal across capacitor 14, is adjusted to have an amplitude identical with the amplitude of the signal appearing across capacitor 14 when the probe rotates opposite a portion of the master curve whose tangent is parallel to the X coordinate and when axis 2 is the desired distance from this curve portion.

Thus any deviation of axis 2 from the desired distance will produce an error signal at the output of the differential circuit which will operate motor 66 so as to drive the movable carriage along the Y axis in a direction to correct this deviation.

In order to correct for the fact that the signal across capacitor 14 is also proportional to the sine of the above-defined angle, potentiometer 71 is provided between circuit 70 and input 72 so as to vary the output of the former in proportion to said sine.

For this purpose, the movable tap of potentiometer 71 is driven by any suitable device 73. For example, this device could comprise an arrangement similar to the assembly 59, of FIG. 5, which assembly would provide an indication of the tangent of said angle, driving potentiometer 71 (and the similar potentiometer of the X axis circuitry), while the potentiometer would be tapered to yield an output proportional to the sine of said angle. The input to assembly 59 could be provided directly from the outputs of filter circuits 13X and 13Y, or through the intermediary of operational amplifiers, or by a separate set of signal processing circuits connected to transformer 10.

In order to drive the carriage, a constant driving signal may be fed to one of the motors, or both motors may be fed by separate signals having a constant vector sum (assuming that one signal is considered to be along the X axis and the other along the Y axis).

While several embodiments of the present invention have been shown and described herein, it should be appreciated that many variations and modifications could be made without departing from the spirit of the invention, whose coverage should therefore be limited only by the scope of the attached claims.

What I claim is:
1. A measuring device comprising:
   (a) a rotatable probe mounted adjacent, and spaced from, one surface of a workpiece;
   (b) means for rotating said probe relative to said surface;
   (c) means electrically linked to said probe and said surface for generating a measuring signal proportional to the distance between said probe and said surface;
   (d) means for generating at least one reference signal synchronized with the frequency of said rotation;
   (e) means connected to said last two recited means for producing at least one signal proportional to the average value of the product of said generated signals;
   (f) means connected to said average value producing means for indicating the magnitude of said product signal; and
   (g) means connected to said relative rotation-producing means for generating a further signal deetrmined, at least in part, by said relative rotation, and combining said further signal with said measuring signal for determining a characteristic of said surface with respect to the axis of said relative rotation.

2. A device as recited in claim 1 wherein said means for generating at least one reference signal comprises means for generating a pair of cyclic reference signals which are 90° out of phase with one another and wherein said average value producing means comprises a pair of identical circuits each of which produces a signal proportional to the average value of the product of said measuring signal and a respective one of said reference signals.

3. A device as recited in claim 1 wherein said means for generating a further signal comprises: a second device which is identical with that recited in claim 1 (a) to (f), and wherein said indicating means include two indicators each operatively connected to both said devices for producing an output which represents the sum of a respective one of the average value product signals produced by one of said devices and a corresponding respective one of the product signals produced by the other of said devices.

4. A device as recited in claim 3 wherein said probes of said two devices are arranged to rotate about a common axis.

5. A measuring device comprising:
   a probe mounted adjacent, and spaced from, one surface of a workpiece;
   means for producing a relative rotation between said probe and said surface;
   means electrically linked to said probe and said surface for generating a measuring signal proportional to the distance between said probe and said surface;
   means for generating a pair of cyclic reference signals which are synchronized with the frequency of said rotation and which are 90° out of phase with one another;
   means connected to said measuring signal generating means and said reference signal generating means and including a pair of identical circuits each of which produces a signal proportional to the average value of the product of said measuring signal and a respective one of said reference signals;
   means connected to said average value producing means for indicating the magnitude of said product signals; and
   means for generating a further signal including: means electrically connected to said measuring signal generating means for developing a signal proportional to variations in said measuring signal; means operatively connected with said developing means for dividing said developing signal into a pair of orthogonal components; means connected to said dividing means for adding each of said orthogonal components to a portion of a respective one of said reference signals; an oscilloscope; and means connected to said adding means for conducting each of the signals resulting from said additions to a respective one of the mutually perpendicular deflection plate inputs of said oscilloscope.

6. A device as recited in claim 5 further comprising means for adding a respective one of average value product signals to each of the signals resulting from said additions.

7. A measuring device comprising:

a probe mounted adjacent, and spaced from, one surface of a workpiece;

means for producing a relative rotation between said probe and said surface;

means electrically linked to said probe and said surface for generating a measuring signal proportional to the distance between said probe and said surface;

means for generating a pair of cyclic reference signals which are synchronized with the frequency of said rotation and which are 90° out of phase with one another;

average value producing means connected to said measuring signal generating means and said means for generating a pair of cyclic reference signals and composed of a pair of identical circuits each of which produces a signal proportional to the average value of the product of said measuring signal and a respective one of said reference signals;

means connected to said average value producing means for indicating at least one characteristic of said product signals, said indicating means including a phase indicating device connected to said circuits producing an average value product signal for providing an indication of the ratio of the amplitudes of said average value product signals, and a pair of signal polarity indicating devices each of which is connected across the output of a respective one of said circuits producing an average value product signal; and signal utilization means electrically connected to said measuring signal generating means for generating a further signal representing a charactertistic of the average distance between said surface and the plane of said relative rotation.

8. A device as recited in claim 7 wherein said signal utilization means comprises auxiliary means responsive to said measuring signal for indicating the average value of the variations of said measuring signal.

9. A measuring device comprising:

a rotatable probe mounted adjacent, and spaced from, one surface of a workpiece;

means for producing a relative rotation between said probe and said surface;

means electrically linked to said probe and said surface for generating a measuring signal proportional to the distance between said probe and said surface;

means for generating a pair of cyclic reference signals which are synchronized with the frequency of said rotation and which are 90° out of phase with one another;

average value producing means connected to said measuring signal generating means and said means for generating a pair of cyclic reference signals and composed of a pair of identical circuits each of which produces a signal proportional to the average value of the product of said measuring signal and a respective one of said reference signals;

means connected to said average value producing means for providing an indication of said product signals; and means for generating a further signal including correlator means having an output, an information input connected to receive said measuring signal, and a control input responsive to one of said reference signals to permit the signal appearing at said information input to pass to said output only at the moments when said one of said reference signals has a predetermined amplitude, and an indicator connected to said correlator output for providing an indication, along a reference line normal to the axis of probe rotation, of the distance between the plane of the probe rotation and the one surface.

10. A device as recited in claim 9 wherein said predetermined amplitude is zero.

11. A device as recited in claim 9 wherein said indicator is an average value indicator having its input connected to said correlator output.

12. A device as recited in claim 11 further comprising a comparator having its input connected to receive said one of said reference signals and its output connected to said correlator control input for delivering a pulse to said correlator input each time said last-named reference signal achieves said predetermined amplitude.

13. A measuring device comprising:

a probe mounted adjacent, and spaced from, one surface of a workpiece;

means for producing a relative rotation between said probe and said surface;

means electrically linked to said probe and said surface for generating a measuring signal proportional to the distance between said probe and said surface;

means for generating a pair of cyclic reference signals which are synchronized with the frequency of said rotation and which are 90° out of phase with one another, each of said reference signals having a maximum value corresponding to the passage of said probe past a respective one of a pair of orthogonal reference axes centered on the axis of said relative rotation;

average value producing means connected to said measuring signal generating means and said means for generating a pair of cyclic reference signals and including a pair of identical circuits each of which produces a signal proportional to the average value of the product of said measuring signal and a respective one of said reference signals;

further signal generating means including: means connected to the output of at least one of said average value producing means circuits for generating a control signal whose amplitude is proportional to a trigonometric function of the angle formed between one of said reference axes and a line tangent to the portion of said surface adjacent said probe and whose polarity is the inverse of the polarity of the signal produced by said circuit; and signal utilization means connected to said control signal generating means and to said at least one circuit for producing a sum signal resulting from algebraically adding said control signal and said signal produced by said circuit.

14. A device as recited in claim 13 wherein said signal utilization means further comprises means responsive to said sum signal for effecting a relative translation between said probe and said piece in such a direction as to reduce the amplitude of said sum signal.

15. A device as recited in claim 13 wherein said one of said average value signals results from the multiplication of that one of said reference signals whose maximum corresponds to the passage of said probe past that one of said reference axes forming one side of said angle.

References Cited

UNITED STATES PATENTS

| | | | |
|---|---|---|---|
| 3,077,781 | 2/1963 | Silver | 73—465 |
| 3,213,690 | 10/1965 | Walton | 73—462 |
| 3,220,247 | 11/1965 | Goodman | 73—67 |

RUDOLPH V. ROLINEC, *Primary Examiner.*

E. E. KUBASIEWICZ, *Assistant Examiner.*